United States Patent [19]

Brands et al.

[11] 4,165,506

[45] Aug. 21, 1979

[54] CONTROL UNIT FOR THE BRIGHTNESS OF VIDEO SIGNALS ON A RASTER SCAN DISPLAY

[75] Inventors: Antoon H. Brands, Borne; Jouke Gietema, Hengelo (O), both of Netherlands

[73] Assignee: Hollandse Signaalapparaten B.V., Hengelo (O), Netherlands

[21] Appl. No.: 804,720

[22] Filed: Jun. 8, 1977

[30] Foreign Application Priority Data

Jun. 26, 1976 [NL] Netherlands .......................... 7606745

[51] Int. Cl.² ............................................. G06K 15/20
[52] U.S. Cl. ................................. 340/706; 343/5 VQ; 340/721; 340/744; 340/799
[58] Field of Search ............. 340/324 AD; 343/5 DP, 343/5 VQ, 5 EM

[56] References Cited

U.S. PATENT DOCUMENTS

| | | | |
|---|---|---|---|
| 3,633,173 | 1/1972 | Edge | 343/5 DP |
| 3,810,174 | 5/1974 | Heard et al. | 343/5 VQ |
| 3,944,998 | 3/1976 | Perkins | 340/324 AD |
| 3,964,064 | 6/1976 | Brandao et al. | 343/5 VQ |
| 3,967,268 | 6/1976 | Roberts | 340/324 AD |
| 3,995,269 | 11/1976 | Schumacher | 340/324 A |
| 4,071,843 | 1/1978 | Marien | 343/5 EM |

*Primary Examiner*—David L. Trafton
*Attorney, Agent, or Firm*—Thomas A. Briody; Edward J. Connors, Jr.; James J. Cannon, Jr.

[57] ABSTRACT

A control unit for the brightness of video signals on a raster scan display is provided with a random-access memory. The data stored in each element of this memory determines the brightness of the video signals on the raster scan display at a position corresponding with this element. In response to the video data supplied to the control unit and the brightness data in the random-access memory a logical unit provides new brightness data which overwrites the brightness data in the memory.

10 Claims, 4 Drawing Figures

| ABCD | EFG | | | | | | | |
|---|---|---|---|---|---|---|---|---|
| | 000 | | 010 | 011 | 100 | 101 | 110 | 111 |
| 0000 | 000 | | 000 | 000 | 100 | 101 | 110 | 111 |
| 0010 | 010 | | 010 | 011 | 010 | 010 | 010 | 010 |
| 0011 | 011 | | 011 | 011 | 011 | 011 | 011 | 011 |
| 0100 | 100 | | 010 | 011 | 100 | 101 | 110 | 111 |
| 0101 | 101 | | 010 | 011 | 101 | 101 | 110 | 111 |
| 0110 | 110 | | 010 | 011 | 110 | 110 | 110 | 111 |
| 0111 | 111 | | 010 | 011 | 111 | 111 | 111 | 111 |
| 1001 | 000 | | 010 | 011 | 000 | 000 | 000 | 000 |
| 1010 | 011 | | 011 | 011 | 011 | 011 | 011 | 011 |
| 1011 | 111 | | 111 | 111 | 111 | 111 | 111 | 111 |
| 1100 | 000 | | 010 | 011 | 100 | 101 | 110 | 110 |
| 1101 | 000 | | 010 | 011 | 100 | 101 | 101 | 111 |
| 1110 | 000 | | 010 | 011 | 100 | 100 | 110 | 111 |
| 1111 | 000 | | 010 | 011 | 000 | 101 | 110 | 111 |

CONTROL UNIT FOR THE BRIGHTNESS OF VIDEO SIGNALS ON A RASTER SCAN DISPLAY

The invention relates to a control unit for the brightness of video signals on a raster scan display, which control unit comprises:

a. a random-access memory, each element of which containing the data required for presenting a video signal on the raster scan display at a position corresponding with the respective element;

b. a read-out circuit connected to the memory for reading out said data and presenting a corresponding video signal on the raster scan display; and c. switching means for supplying the memory alternately with the address information pertaining to the video data to be processed in the control unit and with the address information provided by the readout circuit and required for reading out of the memory.

Such a control unit may be utilized for instance in air traffic control systems, where dititized radar data is loaded into memory on a real-time basis and is subsequently read out for presentation on a raster scan display at such a frequency that a flicker-free picture is generated. The display may thereto be provided with an effective, short persistance phosphor. It should be noted that the data stored in the random-access memory is the same as the above-mentioned video data to be processed in the control unit.

It is however essential to provide means for erasing stale data from the display, i.e. means for refreshing the content of the random-access memory periodically.

As will be known, the video data loaded into memory is associated with the storage of an age and amplitude code. With the latter parameters, it is possible to determine the brightness for each video signal presentation separately and with such a time lapse that permits simulation of any desired phosphor persistence characteristic, despite the use of a short-persistence phosphor. For example, a moving target may be represented by the display of a given series of dots of decrementing intensity. Such a system of brightness control however requires a large memory capacity for the storage of an age and amplitude code; for this reason, it can be put to practical use for only a limited number of video signals. First, the video data of the targets to be displayed (in practice the moving targets) must be extracted from the total video data flow; only this extracted video data can be provided with an age and amplitude code and stored in memory.

However, if it is desired to display, in addition to specially extracted data, all data detected by a radar receiver, supplemented by synthetic data, it is difficult—for reasons of economy—to provide each video signal with an age and amplitude code; moreover, such a system will surely be of no use if the application of a fine display raster of say 896×896 picture elements is desired.

It is therefore an object of the present invention to provide a control unit, as set forth in the opening paragraph, with the aid of which all data on a display can be erased, displayed with decrementing intensity or replaced by new data in a simplified manner, particularly with the application of a large video data flow and therewith a memory of very large capacity, without data extraction.

In the control unit according to the invention the data stored in the random-access memory defines exclusively the brightness of the video signals presented on the raster scan display. The control unit further comprises a logical unit that, in response to the video data processed in the control unit and the brightness data in the random-access memory, provides new brightness data which overwrites the brightness data in the random-access memory.

The video data to be processed in the control unit is therefore by itself not brightness data, but effects the storage of the desired brightness data into the random-access memory. In this way it is possible to store into memory data that defines various brightness levels, depending on the conditions established in the logical unit and on the brightness data already stored in memory. Depending on the source of the video data to be processed in the control unit, the brightness level at which the data corresponding with this video data is displayed can be raised or lowered.

The invention will now be further explained with reference to the accompanying figures, of which FIG. 1 is a block diagram of the control unit according to the invention;

Figures 1, 3:
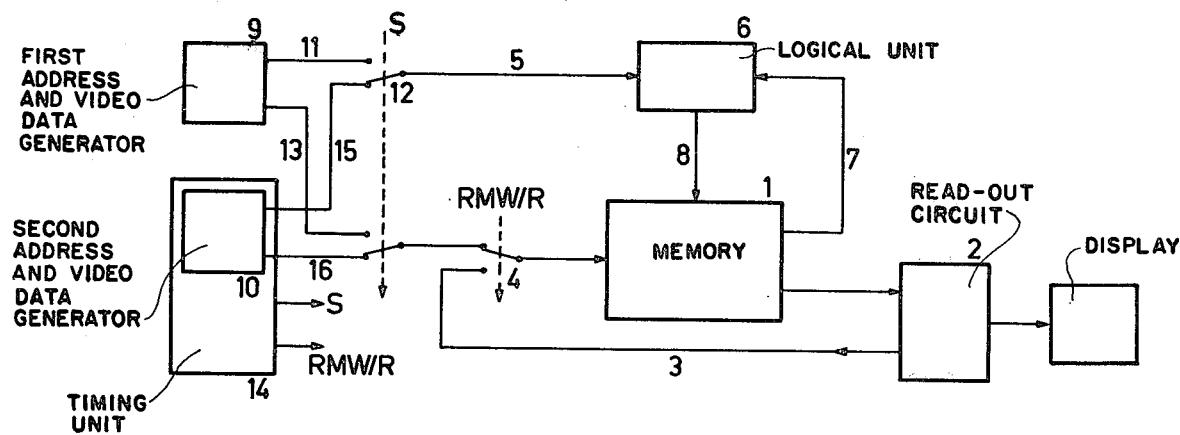
FIG. 3 shows a truth table of the logical unit in a more complicated embodiment.

The diagram of FIG. 1 is adapted to the application of the invention in a digital scan converter, in which the random-access memory consists of a number of simultaneously accessible submemories.

Like parts in the figures are denoted by like reference numbers.

In FIG. 1 the random-access memory (RAM) is denoted by 1. Each element of this memory corresponds with one point of the raster of a raster scan display (not shown in the figure) and contains the information required for the display of a video signal at a corresponding point of the raster scan display. The memory-stored data is read out at such a frequency that a flicker-free picture is generated. Therefore a circuit 2, connected to the memory 1, is provided to read out the memory data, to process this data for the generation of video signals and to present these video signals on the display.

Each memory element comprises a given number of bit positions; this number is two and three in the examples given hereinafter. Theoretically, it is possible to employ larger memory elements but these are very expensive. The content of such a memory element determines the intensity at which radar and synthetic video signals are presented on the raster scan display at a position corresponding with the respective memory element; the content of a memory element is hereinafter termed "brightness data".

To read the brightness data out of memory, circuit 2 supplies the required memory addresses via the line 3 and the switch 4. In this situation, the switch 4 is in the R(read) position not shown in the figure.

The memory is supplied alternately, via switch 4, with the address information of the video data to be processed in the control unit and the address information supplied by the circuit 2 and required for reading out the memory 1.

With switch 4 in the RMW(read/modify/write) position, as shown in the figure, the memory element is addressed and its content is to be re-established. The video data to be processed in the control unit is thereto supplied to a logical unit 6 via the line 5. Also the content of the memory allocated by the address information of this video data is fed to logical unit 6 via line 7. From the information applied to logical unit 6, the content of the respective memory element is re-established via line 8. It should be noted that this does not infer that the content of this memory element necessarily differs from the foregoing content of this element.

As already stated, the content of a memory element consists of brightness data. Thus the video data to be processed in the control unit, i.e. the video data supplied via line 5, need not contain any brightness data itself. However, this will be so if this data consists of a quantized and digitized radar video signal or a similar synthetic signal. On the other hand, the video data supplied via line 5 may consist of a command signal, in consequence of which the brightness data in memory 1 has to be altered. Such a command signal is here considered to be video data as well, since it is processed in the same way as radar and synthetic video data, while it exercises the same influence on the brightness of the video signals on the display.

The control unit, as shown in FIG. 1, further comprises a first address and video data generator 9 and a second address and video data generator 10. The data generator 9 may consist of either a radar receiver or a data-storage unit, such as a cassette recorder with adapter. In the case of a radar receiver, the video data to be processed in the control unit is composed of a quantised and digitised radar signal with the addition of the relevant cartesian coordinates of the memory element and therewith of the point on the raster scan display at which a corresponding video signal is displayed. In the case of a data-storage unit with adapter, the video data is composed of a digitized synthetic signal, again with the addition of the relevant Cartesian coordinates of the memory element and therewith of the point on the raster scan display at which a corresponding video signal is displayed.

The quantized and digitized radar signal, or the digitized synthetic signal is applied to the logical unit 6 via line 11, switch 12 and line 5, while the corresponding Cartesian coordinate addresses are supplied to the memory 1 via line 13 and switches 12 and 4.

The data generator 10 forms part of a timing unit 14 and delivers command signals to the logical unit 6 via line 15, switch 12 and line 5 in order to alter the brightness data in memory 1. The address information thereto required is supplied to memory 1 by generator 10 via line 16 and switches 12 and 4.

In principle, the switch 12 is in the position not shown in the figure, whereas at certain instances, determined in the timing unit 14, the switch 12 is in the shown position. The timing unit 14 also determines the actuation of the RMW/R switch 4.

In should be noted that, although not shown in the figure, a plurality of address and data generators of the type like data generator 9 may be included, e.g. both a radar receiver and a data-storage unit with adapter. In such a case, the timing unit 14 is to determine the instant of time when each of these generators has access to memory 1.

First of all, the very simple situation is considered, viz. the provision of a radar receiver as first address and data generator 9, supplying the following radar video data:

010, a signal indicating that the corresponding video signal is to be displayed at half the intensity (brightness level ½);

011, a signal indicating that the corresponding video signal is to be displayed with full intensity (brightness level 1);

while the second address and data generator 10 produces the following signals:

100, indicating that the radar data on the display must be cleared, i.e. brought back to brightness level 0;

101, indicating that the entire display must be lit at full intensity (brightness level 1);

110, indicating that the radar data, displayed at brightness level 1 must be displayed at brightness level ½;

111, indicating that the radar data, displayed at brightness level ½ must be cleared.

The latter two command signals are supplied periodically to prevent that the entire display will finally light up. The former two command signals are applied by the intervention of an operator using a keyboard.

The video data to be processed in the control unit therefore consists of three bits, viz. a, b and c. These three bits are applied to the logical unit 6. This unit is also supplied with the brightness data from the respective memory element, providing in the case in question two bits e and f, of which:

00 indicates that no data will be visible at the corresponding position on the display (brightness level 0);

10 indicates that the radar data must be displayed at brightness level ½; and 11 indicates that the radar data must be displayed at brightness level 1.

Figure 2:
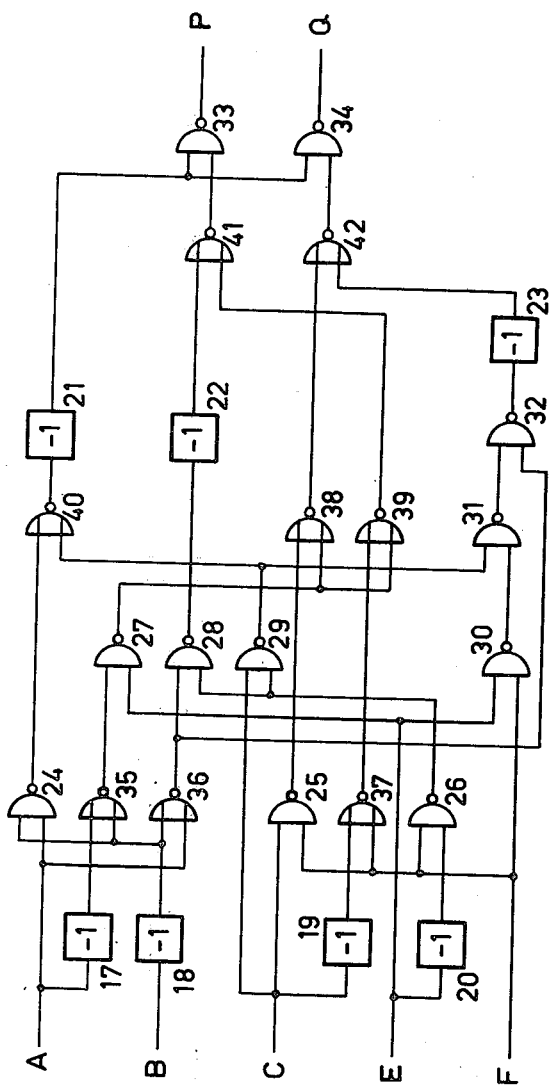
FIG. 2 illustrates a simplified diagram of the logical unit.

The brightness data supplied by logical unit 6, which data overwrites the data already present, is given by the Boolean expressions:

$p = \bar{a}b(e+\bar{f}) + a\bar{b}c(e+\bar{f}) + abe(\bar{c}+f)$
$q = \bar{a}bef + c(e+\bar{f}) + a\bar{b}c(e+\bar{f}) + abcef.$ To realize these logical functions, the logical unit 6 shown in FIG. 2 consists of seven inverters 17–23, eleven NAND circuits 24–34 and eight NOR circuits 35–42, which logical elements are connected to each other shown in the figure.

The bits p and q are:

00 if: (1) abc=100, irrespective of ef; i.e. the memory-stored brightness level is overwritten by the 0 level, irrespective of the stored value (0, ½ or 1);

(2) abc=110 or 111 and ef=00; i.e. with the command signal that changes the brightness level from 1 to ½ or from ½ to 0, the memory content remains unaltered if it already contained brightness level 0;

(3) abc=111 and ef=10; i.e. the command signal 111 brings brightness level ½ back to the 0 level.

10 if: (1) abc=010 and ef=00 or 10; i.e. a video signal corresponding with a radar target return is to be displayed at brightness level ½, unless a video signal has already been displayed at brightness level 1;

(2) abc=010 and ef=10 or 11, i.e. the command signal 110 brings brightness level 1 back to level ½ unless this level was already ½ or 0.

11 if: (1) abc=010 and ef=11, i.e. brightness level 1, at which a video signal has already been displayed, is left unchanged by the new radar video data of lower brightness level (½);

(2) abc=011, i.e. even if no radar video signal was displayed, or a radar video signal was displayed at brightness level ½, the newly applied radar video data brings about that radar video signals are displayed at brightness level 1;

(3) abc=101, irrespective of ef; i.e. the brightness data stored in memory is preset to brightness level 1;

(4) abc=111 and ef=11, i.e. the command signal that brings brightness level ½ back to the 0 level leaves brightness level 1 unchanged.

In more complicated situations, e.g. if two generators of the type like address and data generator 9, viz. a radar receiver and a cassette recorder with adapter are used and the second generator 10 is capable to deliver a larger number of command signals than the number mentioned above, the logical unit 6 cannot be represented by such a simple circuit as shown in FIG. 2. In such a case, the logical unit 6 functions as a preprogrammed memory which, according to the present state of the art, effects a great saving in expense with respect to the use of various logical components. As in this case the Boolean expressions assume a more complicated character, a truth table (FIG. 3) is shown instead. This table lists the values of the brightness data pqr overwriting the data efg, already stored in memory, as determined by the video data in four bits abcd and the brightness data, i.e. the content of a memory element, in three bits efg.

The video data abcd, supplied to the logical unit 6 may represent:

0000: the synthetic data on the display must be cleared, i.e. brought back to brightness level 0;

0010: synthetic data is displayed at brightness level ½ unconditionally, i.e. if necessary, overwriting the displayed radar data, unless synthetic data has already been displayed at brightness level 1;

0011: synthetic data is displayed at brightness level 1 unconditionally, i.e. if necessary, overwriting the displayed radar data;

0100: radar data is displayed at brightness level ¼ if at the respective position on the display no radar data was displayed or radar data was displayed at brightness level ¼;

0101: radar data is displayed at brightness level ½ if at the respective position on the display no radar data was displayed or radar data was displayed at brightness level ¼ or ½;

0110: radar data is displayed at brightness level ¾ if at the respective position on the display no radar data was displayed or radar data was displayed at brightness level ¼, ½ or ¾;

0111: radar data is displayed at brightness level 1 if at the respective position on the display no radar data was displayed or radar data was displayed at any brightness level;

1001: the radar data on the display must be cleared, i.e. brought back to brightness level 0;

1010: the display is preset to brightness level ½;

1011: the display is preset to brightness level 1;

1100: radar data displayed at brightness level 1 must be brought back to level ¾;

1101: radar data displayed at brightness level ¾ must be brought back to level ½;

1110: radar data displayed at brightness level ½ must be brought back to level ¼;

1111: radar data displayed at brightness level ¼ must be brought back to the 0 level.

A memory element, consisting of three bits efg, may represent:

000: no data is visible at the corresponding position on the display;

010 and 011: synthetic data is displayed at brightness levels ½ and 1 respectively;

100, 101, 110 and 111: radar data is displayed at brightness levels ¼, ½, ¾ and 1 respectively.

With each reception of radar or synthetic video data or a command signal, the content of this memory element is replaced by the same or other brightness data of the aforementioned type.

The first address generator 9 produces data on a real-time basis, increasing the brightness level at which corresponding video signals are displayed. The second address generator 10 supplies data (command signals) at fixed instants of time, decreasing the brightness level at which corresponding video signals are presented on the display (except the resetting of the display to a certain brightness level).

The data supplied by the first address generator 9 changes only the content of the separate memory elements: radar or synthetic video data effects the change of specifically addressed memory elements only. The command signals produced by the second address generator 10 act successively on the major part of the memory elements; a decrease in brightness level affects the entire display, except the displayed synthetics.

If a video signal is displayed at brightness level 1, the timing unit (14 in FIG. 1) delivers the command signals, which lower the brightness level, at fixed instants of time, such that a persistence effect resembling a long-persistence phosphor is obtained. The addresses pertaining to these command signals are generated pseudo-randomly to effect a reduction in display brightness as uniformly as possible.

Figure 4:
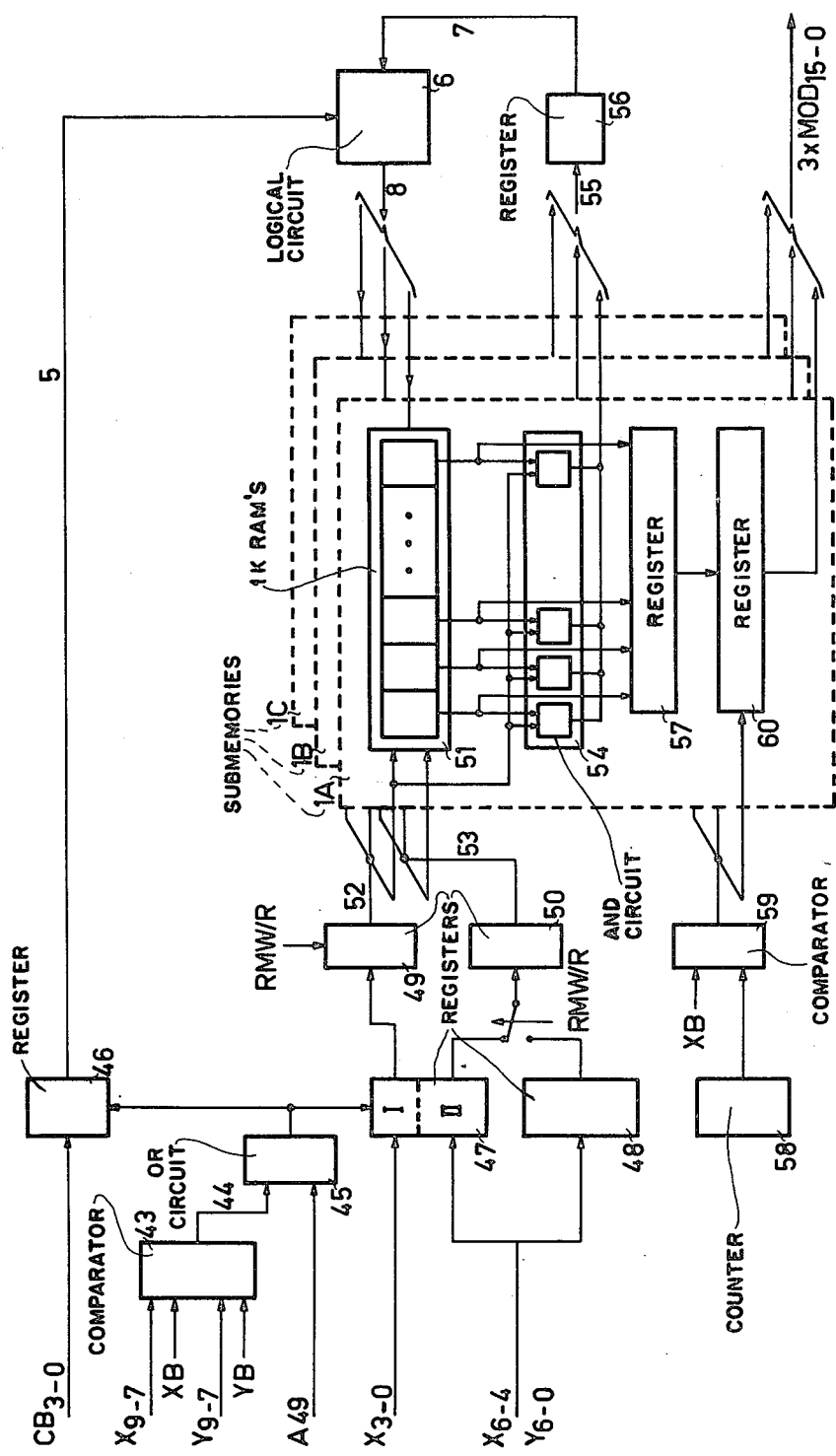
FIG. 4 shows a more detailed diagram of a portion of the block diagram illustrated in FIG. 1.

FIG. 4 shows a detailed diagram of a portion of the block diagram of FIG. 1, subject to the condition that the embodiment is adapted for application in a digital scan converter, as described in the Dutch patent application No. 7,601,535, and corresponding copending U.S. patent application Ser. No. 765,937, filed Feb. 7, 1977. If it is desired to present not only extracted radar video data, but all radar-detected data, supplemented with synthetic data, on a raster scan display with a very large number of picture elements, it is desirable to divide the memory into a number of (N×N) simultaneously accessible submemories. In such a case, the division as shown in the diagram of FIG. 4 should be contained in all N×N submemories. Except for the addressing, the embodiment is not subject to changes however.

Before further elaboration of FIG. 4, a summary of the digital scan converter, as described in the above-mentioned patent applications is given below. This application refers to a digital scan converter for the presentation of data, obtained from radar-received video signals, on a raster scan display. The incoming video signals are quantized and placed in a radar input buffer at addresses corresponding to the pattern, according to which the field of view, determined by the radar sensor in azimuth and range coordinates (i.e., polar coordinates) is scanned at a given (first) rate. The digital scan converter further comprises a random-access memory for receiving data from the radar input buffer. This random-access memory consists of N×N simultaneously accessible submemories all containing a×a memory elements. Further an address generating circuit is incorporated, generating addresses as functions of the scan pattern and scanning rate to accommodate the data read from the input buffer in the random-access memory at locations corresponding to the display line pattern on the raster scan display. The display raster consists of b picture lines each having b picture elements, so that the memory contains $b^2$ ($b=Na$) memory elements. For the range scan of the radar in any azimuth value ($\phi$), the range considered is divided into n ($n \leq N$) segments of each k range increments $\Delta r$, where the length $k\Delta r$ of each of these segments equals at least the range represented by "a" memory elements, multiplied by a factor $\sqrt{2}$. The above address generating circuit consists of the conventional azimuth counter and sine/cosine generator, a start address generator delivering the start address values $1k\Delta r \cos \phi$ and $1k\Delta r \sin \phi$ (where $1=0, 1, 2, \ldots, n-1$) for the supply of the signals from the sine/cosine generator. An increment address generator, considering the above n start addresses, increments all n start addresses by $\Delta r \cos \phi$ and $\Delta r \sin \phi$ in each random access memory cycle, generating in k successive random-access memory cycles the addresses $x = x_c + (1k+m)\Delta r \cos \phi$ and $y = y_c + (1k+m)\Delta r \sin \phi$, where $x_c$ and $y_c$ represent the coordinates of the radar sensor position, $1 = 0, 1, 2, \ldots, n-1$ for each memory cycle, and $m = 0, 1, 2, \ldots, k-1$. The stored data of the radar input buffer, corresponding to the n ranges of which the addresses are defined in each memory cycle, is transferred to the address-defined positions of the random-access memory in the respective memory cycle, allocating a position within one submemory by one address only. For each picture line, the relevant data is read from the respective N submemories simultaneously. The digital scan converter contains a readout unit for reading out the data stored in the random-access memory and to be presented on the raster scan display at a given (second) rate. The readout unit contains at least one picture line memory storing the data of a picture line in order to be read out in the sequence as required for presentation on the raster scan display.

In a preferred embodiment $b=896$, $N=7$ and hence $a=128$. The readout frequency of the memory-stored data is 55 Hz. The horizontal row of seven submemories is read out simultaneously for each picture line. In the preferred embodiment, each of the submemories consists of sixteen $1024 \times 1$ static RAMs (random-access memories), while they can be read out in 16 bits in parallel. Hence, to read out one picture line, the first 16 memory elements in a row of the respective 7 submemories are read first, then the next 16 memory elements in a row of the submemories, etc. In this way $7 \times 16$ memory elements are read out in the memory cycle, reading out a picture line of 896 memory elements in 8 memory cycles. If each memory element consists of a single bit, seven 16-bit words are read out in parallel each memory cycle. If each memory element consists of several bits, say 3 bits, $7 \times 3$ words of 16 bits are read out in parallel each memory cycle. The way in which the random-access memory can be read out and the further processing of the readout data are further described in the Dutch patent application No. 7,603,159, and corresponding U.S. Pat. No. 4,097,848, issued June 27, 1978.

Referring to FIG. 4, it should be noted that the first and the second address and data generators (9 and 10) produce: video data (radar or synthetic video data or command signals), which is further represented by the four bits CB 3-0, and address data which is further represented by X 9-0 and Y 9-0, i.e. by the 10-bit X and Y addresses of a memory element and the corresponding point on the raster scan display. To address the memory, which in the given instance contains $896 \times 896$ memory elements, at least ten X and Y bits are required. The signals produced by the second address and data generator 10 are accompanied with a signal A 49, indicating that the respective addressing applies to all 49 submemories; for these submemories are all simultaneously accessible permitting the output of brightness decreasing or preset command signals for all 49 submemories simultaneously.

The X and Y addresses of a memory element contain a submemory address X 9-7 and Y 9-7, i.e. the address of a given submemory. The delivery of the address data to all 49 submemories requires a comparator 43, which establishes whether the applied submemory address X 9-7, Y 9-7 corresponds with the address code XB, YB, specifically incorporated for each submemory. If the applied address is destined for the respective submemory, a signal is delivered via line 44. Either the latter signal or the A 49 signal, which indicates that the applied address is intended for all submemories, is passed through the OR circuit 45 and used as write signal for the video data CD 3-0 in the register 46 and the address part X 3-0 in section I of the register 47. Since each submemory comprises sixteen 1k RAMs, the four bits X 3-0 are used for the RAM addressing. The address parts X 6-4, Y 6-0, which determines the location within a given 1k RAM, are placed in section II of register 47. This register thus contains the address of a specific location in the submemory.

As already stated, each of the submemories of all RAMs are read out simultaneously, thus in 16 bits in parallel. This makes a specific RAM addressing superfluous. The address parts X 6-4 and Y 6-0 are therefore placed in register 48 as well, allocating 16 corresponding memory locations within the RAMs of the submemory. The RMW/R signal from the timing unit 14 allocates alternately the address of a specific memory location and a series of corresponding addresses for reading the data. In an RMW period, i.e. in the space of time when the brightness data stored in memory can be changed, the content of section I of register 47 is transferred to register 49 and that of section II of register 47 to register 50. In an R period, i.e. in the space of times when data can be read out of memory, register 50 receives only the content of register 48, while register 49 is preset.

In case a memory element consists of three bits, the submemory 1 comprises three identical circuits 1a, 1b and 1c; for convenience's sake, only the circuit 1a will be considered. The data from and to the memory 1 is however split into three parts in FIG. 4.

The sixteen 1k RAMs are denoted by 51. In one RMW period, a specific memory element is addressed via lines 52 and 53, while all except one of the AND circuits 54 connected to each of the RAMs are disabled. Depending on the decoded RAM addressing, the AND circuit connected to the addressed RAM is opened, permitting the content of the addressed memory location to be transferred to register 56 via line 55. The brightness data thus read out is applied to the logical unit 6 via line 7.

As already stated, on account of this brightness data, supplied via line 7 and the bits CB 3-0, the logical unit 6 provides new brightness data which is transferred to the addressed memory location via line 8.

In an R period, the sixteen corresponding locations in each of the RAMs are addressed via line 53, all of the AND circuits 54 are blocked by the signal via line 52, and the data read from each of the RAMs is written into register 57. The data stored in register 57, together with the corresponding data from six other submemories, is applied to the circuit 2 in FIG. 1. The entire memory must ultimately deliver 7×16 bits. A counter 58 and a comparator 59, comparing the output signal of counter 58 with the submemory address code XB, make that the 16-bit groups are delivered in the correct sequence by the seven submemories. It should be noted that for 3-bit memory elements a number of 7×16×3 bits are delivered simultaneously by the entire memory. The data, read out of register 57 via register 60, is applied to circuit 2 (shown in FIG. 1) together with the data from submemories 1b and 1c, denoted by 3×MOD 15-0.

The description of FIG. 4 is based on a division of the memory into submemories. By omitting such a division, the addressing and the readout method can be simplified; the way in which the content of the memory can be altered remains the same.

What we claim is:

1. A control unit for a raster scan display comprising:
   a random access memory comprising a plurality of elements each containing only the brightness data associated with a video signal to be displayed at a predetermined position on the raster scan display corresponding to the memory address of said element;
   a readout circuit connected to said memory which functions to provide a memory address to said memory and to read out said data at the corresponding one of said memory elements and present a corresponding video signal on the raster scan display;
   switching means connected to said memory which function to alternately supply the memory with an address pertaining to data in one of said memory elements to be modified, and with an address provided by the readout circuit pertaining to data in one of said memory elements required to be read out of said memory; and
   a logical unit connected to said switching means and said memory which functions to independently overwrite the data in ones of said elements of said memory.

2. A control unit as claimed in claim 1, further comprising a first first-address-and-video data generator connected to said switching means which functions to determine the address of the memory element in said random access memory to which video data is to be applied; and
   a second-address-and-video-data generator connected to said switching means which functions to determine the address of the memory element in said memory of predetermined brightness data of a video signal previously presented at the position on the raster scan display corresponding to said address of the memory element, and to reduce the brightness data therein.

3. A control unit as claimed in claim 2, wherein said first first-address-and-video-data generator provides a representation of the display in polar coordinates, and said raster scan display presents said data in Cartesian coordinates.

4. A control unit as claimed in claim 2, wherein said first first-address-and-video-data generator comprises a radar receiver.

5. A control unit as claimed in claim 2, wherein said first first-address-and-video-data generator comprises a data-storage unit including an adapter which provides the video data and the corresponding addresses in said memory for the presentation of said video data on the raster scan display.

6. A control unit as claimed in claim 2, further comprising a second first-address-and-video-data-generator, said first generator comprising a radar receiver and said second generator comprising a data-storage unit including an adapter which functions to provide the video data and the addresses in said memory for the presentation of radar video data and synthetic video data, respectively, on the raster scan display, said first and second generators being connectable to said memory and to said logical unit via said switching means.

7. A control unit as claimed in claim 1, further comprising a timing unit connected to said switching means which functions to deliver video data and addresses to said memory at predetermined times for reducing the brightness of the previously displayed video signals on the raster scan display in a stepwise manner to zero.

8. A control unit as claimed in claim 7, further comprising a raster scan display having a short-persistence phosphor connected to said memory which functions to display video data responsive to the brightness reducing steps at predetermined times which succeed each other at different intervals specified by said timing unit so that a phosphor persistence of predetermined duration is simulated on said raster scan display.

9. A control unit as claimed in claim 1, wherein said logical unit comprises a logic circuit including AND gates, OR gates, and inverters.

10. A control unit as claimed in claim 1, wherein said logical unit comprises a preprogrammed memory.

* * * * *